US008009784B2

(12) United States Patent
Ko (10) Patent No.: US 8,009,784 B2
(45) Date of Patent: Aug. 30, 2011

(54) CLOCK EMBEDDED DIFFERENTIAL DATA RECEIVING SYSTEM FOR TERNARY LINES DIFFERENTIAL SIGNALING

(75) Inventor: Jae Gan Ko, Bucheon-si (KR)

(73) Assignee: TLI Inc., Seongnam-si (KR)

( * ) Notice: Subject to any disclaimer, the term of this patent is extended or adjusted under 35 U.S.C. 154(b) by 883 days.

(21) Appl. No.: 12/022,248

(22) Filed: Jan. 30, 2008

(65) Prior Publication Data
US 2009/0092212 A1 Apr. 9, 2009

(30) Foreign Application Priority Data

Oct. 8, 2007 (KR) .................. 10-2007-0101020

(51) Int. Cl.
*H04L 7/02* (2006.01)
(52) U.S. Cl. ........................................ 375/360
(58) Field of Classification Search .......... 375/226, 375/257, 258, 259, 260, 280, 286, 288, 316, 375/354, 355, 359, 360, 371; 365/49.17, 365/185.08, 189.05, 185.07, 233.5
See application file for complete search history.

(56) References Cited

U.S. PATENT DOCUMENTS

| | | | | |
|---|---|---|---|---|
| 3,702,379 A | * | 11/1972 | Peterson et al. | ........... 370/500 |
| 5,325,355 A | * | 6/1994 | Oprescu et al. | ........... 370/282 |
| 6,026,124 A | | 2/2000 | Lee et al. | |
| 6,178,198 B1 | | 1/2001 | Samueli et al. | |
| 6,359,931 B1 | | 3/2002 | Perino et al. | |
| 6,493,394 B2 | * | 12/2002 | Tamura et al. | ........... 375/257 |
| 6,556,628 B1 | | 4/2003 | Poulton et al. | |
| 6,842,037 B1 | | 1/2005 | Gradl | |
| 7,015,725 B1 | * | 3/2006 | Yu et al. | ........... 327/12 |
| 7,072,355 B2 | | 7/2006 | Kizer | |
| 7,307,558 B1 | * | 12/2007 | Karim et al. | ........... 341/100 |
| 2001/0014922 A1 | * | 8/2001 | Kuge | ........... 710/36 |
| 2002/0149403 A1 | * | 10/2002 | Chung et al. | ........... 327/108 |
| 2004/0202270 A1 | * | 10/2004 | Lentine et al. | ........... 375/376 |
| 2007/0160155 A1 | * | 7/2007 | Choi | ........... 375/257 |

FOREIGN PATENT DOCUMENTS

KR 10-2004-0087351 A 10/2004
KR 10-2007-0074289 A 7/2007

OTHER PUBLICATIONS

Jae-Yoon Sim, Multilevel Differential Encoding With Precentering for High-Speed Parallel Link Transceiver—IEEE Journal of Solid-State Circuits, vol. 40, No. 8, Aug. 2005, pp. 1688-1694.
TLDS (Ternary Lines Differential Signaling), A New Serial Interface for Cost Effective TFT-LCD—2005 SID International Symposium Digest of Technical Papers vol. XXXV1, Book I.

* cited by examiner

*Primary Examiner* — Dac V Ha
*Assistant Examiner* — Syed Haider
(74) *Attorney, Agent, or Firm* — Kile Park Goekjian Reed & McManus PLLC (57) ABSTRACT

A clock embedded differential data receiving system for ternary lines differential signaling. The clock embedded differential data receiving system includes a monitoring portion which monitors voltage levels of first, second and third transfer signals to generate a clock signal, a first pre-data and a second pre-data, a data generating portion which detects the first pre-data and the second pre-data in response to a sampling control signal, and generates an output data group with decoding of the first pre-data and the second pre-data, and a timing controller to delay the transition time point of the clock signal with a delay phase which generates the sampling control signal.

17 Claims, 8 Drawing Sheets

| PE1 / PE2 | $S_{123}$ | $S_{132}$ | $S_{312}$ |
|---|---|---|---|
| $S_{213}$ | 000 | 001 | 010 |
| $S_{231}$ | 011 | SPST | 100 |
| $S_{321}$ | 101 | 110 | 111 |

FIG. 7 though to Korean Patent Application No. 10-2007-0101020, filed on Oct. 8, 2007

CLOCK EMBEDDED DIFFERENTIAL DATA RECEIVING SYSTEM FOR TERNARY LINES DIFFERENTIAL SIGNALING

This application claims priority to Korean Patent Application No. 10-2007-0101020, filed on Oct. 8, 2007, all of the benefits accruing therefrom under 35 U.S.C. §119, the contents of which in its entirety is incorporated herein by reference.

BACKGROUND OF THE INVENTION

1. Field of the Invention

The present invention relates to a differential data receiving system, more particularly, to a clock embedded differential data receiving system for ternary lines differential signaling.

2. Description of the Related Art

Differential signaling is widely used for transferring data. The differential signaling is a conventional method for transferring differential data. The differential data is a fair of plus (+) signal and minus (−) signal. The differential signaling has advantages in low electromagnetic interference (EMI), high noise immunity and high speed, comparing with single-ended signaling. However, the number of the transfer lines is increased for the differential signaling. Accordingly, the differential signaling has a disadvantage in layout area.

Therefore, many methods of differential signaling are developed to reduce the number of the transfer lines. And, Ternary Lines Differential Signaling (TDLS) is one of them.

According to TDLS, a ternary set is consisted of ternary lines. With TDLS, the number of transferred data bit per transfer line is increased.

However, there is no differential data receiving system to efficiently receive the differential data transferred by TDLS.

BRIEF SUMMARY OF THE INVENTION

The present invention has made an effort to solve the above stated problems, and an aspect of the present invention provides a differential data receiving system to receive the differential data transferred by TDLS.

According to an exemplary embodiment, the present invention provides a clock embedded differential data receiving system for receiving first, second and third transfer signals transferred via ternary lines. The clock embedded differential data receiving system includes a monitoring portion which monitors voltage levels of the first, second and third transfer signals, and generates a clock signal, a first pre-data and a second pre-data, wherein the clock signal includes a logic state according to a comparison of the voltage levels between the first transfer signal and the second transfer signal, and wherein the first pre-data includes a logic state according to a comparison of the voltage levels between the second transfer signal and the third transfer signal, and wherein the second pre-data includes a logic state according to a comparison of the voltage levels between the third transfer signal and the first transfer signal, a data generating portion which detects the first pre-data and the second pre-data in response to a sampling control signal, and generates an output data group which decodes the first pre-data and the second pre-data, and a timing controller which delays the transition time point of the clock signal with a delay phase and generates the sampling control signal.

BRIEF DESCRIPTION OF THE DRAWINGS

The above and/or other aspects, features and advantages of the present invention will become more apparent from the following detailed description when taken in conjunction with the accompanying drawings, in which.

DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. Hereinafter, exemplary embodiments of the present invention will be described in detail with reference to the accompanying drawings.

Figure 1:
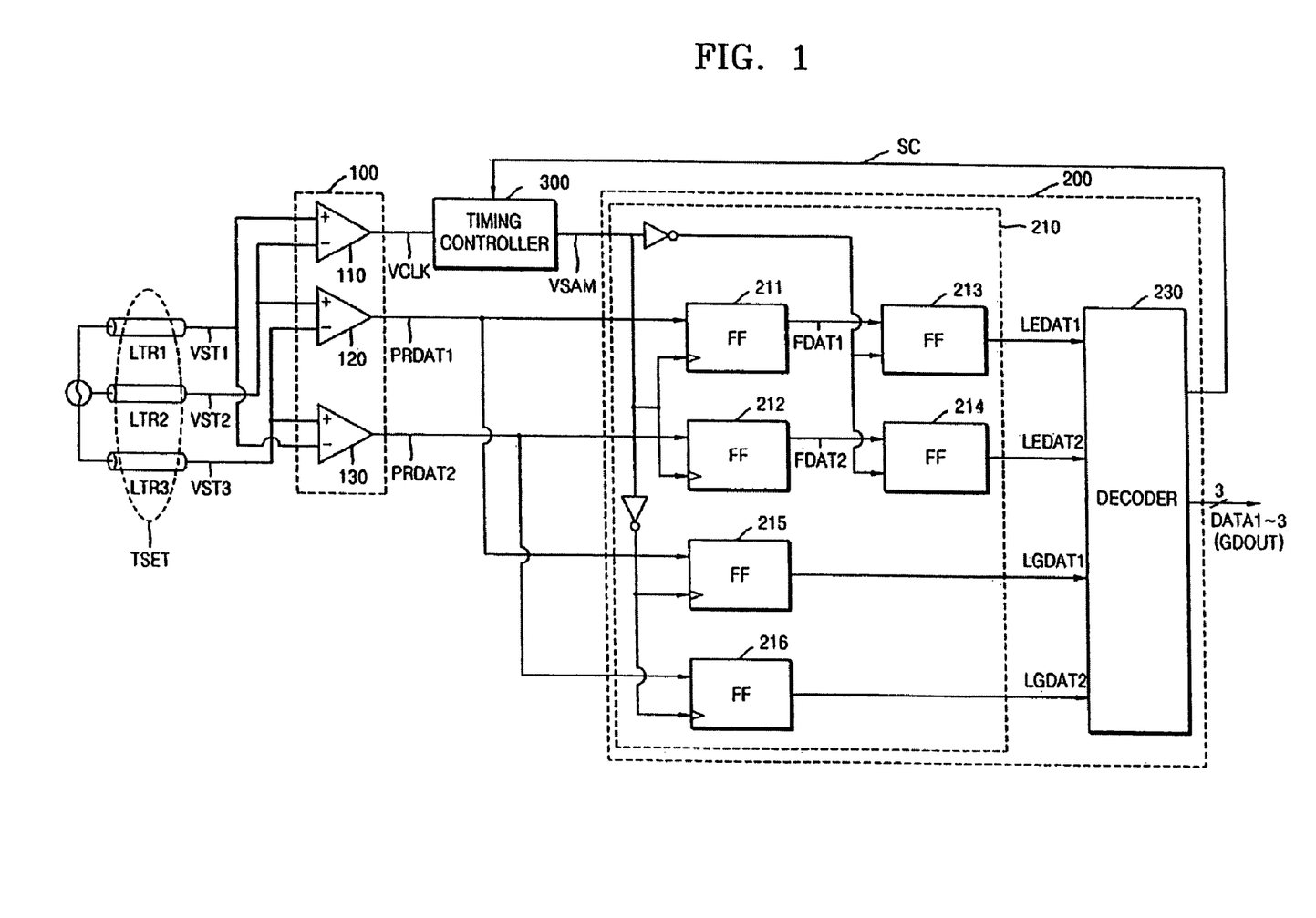
FIG. 1 is a diagram of an exemplary embodiment of a clock embedded differential data receiving system according to the present invention.

FIG. 1 is a diagram of an exemplary embodiment a clock embedded differential data receiving system according to the present invention. Referring to FIG. 1, the clock embedded differential data receiving system of the present invention receives first, second and third transfer signals VST1 to VST3 transferred via ternary lines LTR1, LTR2 and LTR3, respectively.

At this time, according to an exemplary embodiment, six data states can be assigned based on a comparison of the voltage levels in the three transfer signals VST1 to VST3. If a relation of the voltage levels in two transfer signals is set, the number of the data states to be assigned is 3.

According to an exemplary embodiment, when a clock signal VCLK includes a logic state according to a relation of the voltage levels in two transfer signals VST1 and VST2, the number of the data states to be assigned per data period is 3. Therefore, the number of the data states to be assigned per two data period is 9.

Figure 2A:
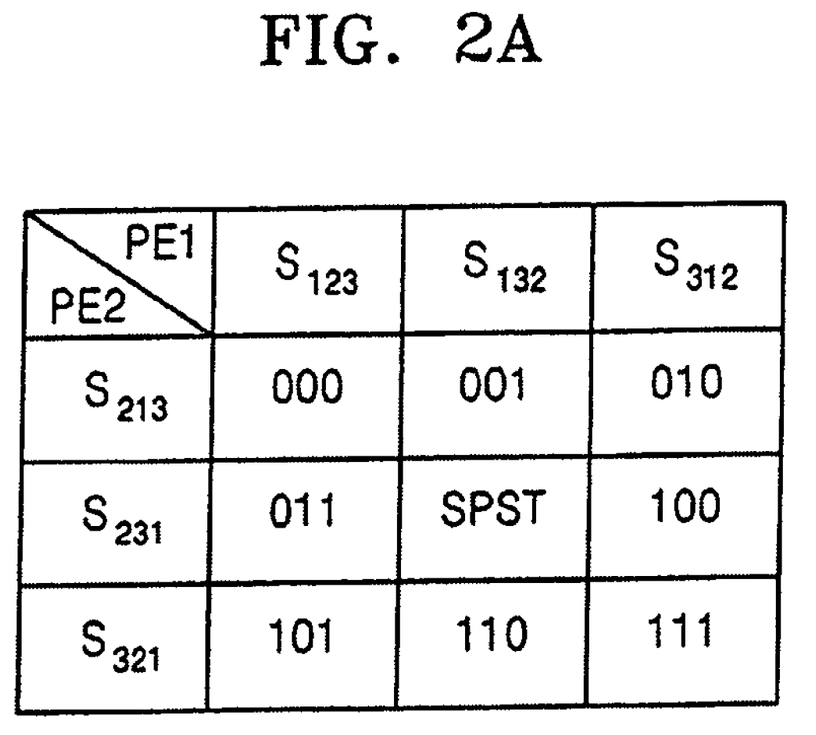
FIG. 2A and FIG. 2B are diagrams of an exemplary embodiment for explaining the values of the first, second and third output data transferred by ternary lines differential signaling, according to the present invention.
Figure 2B:
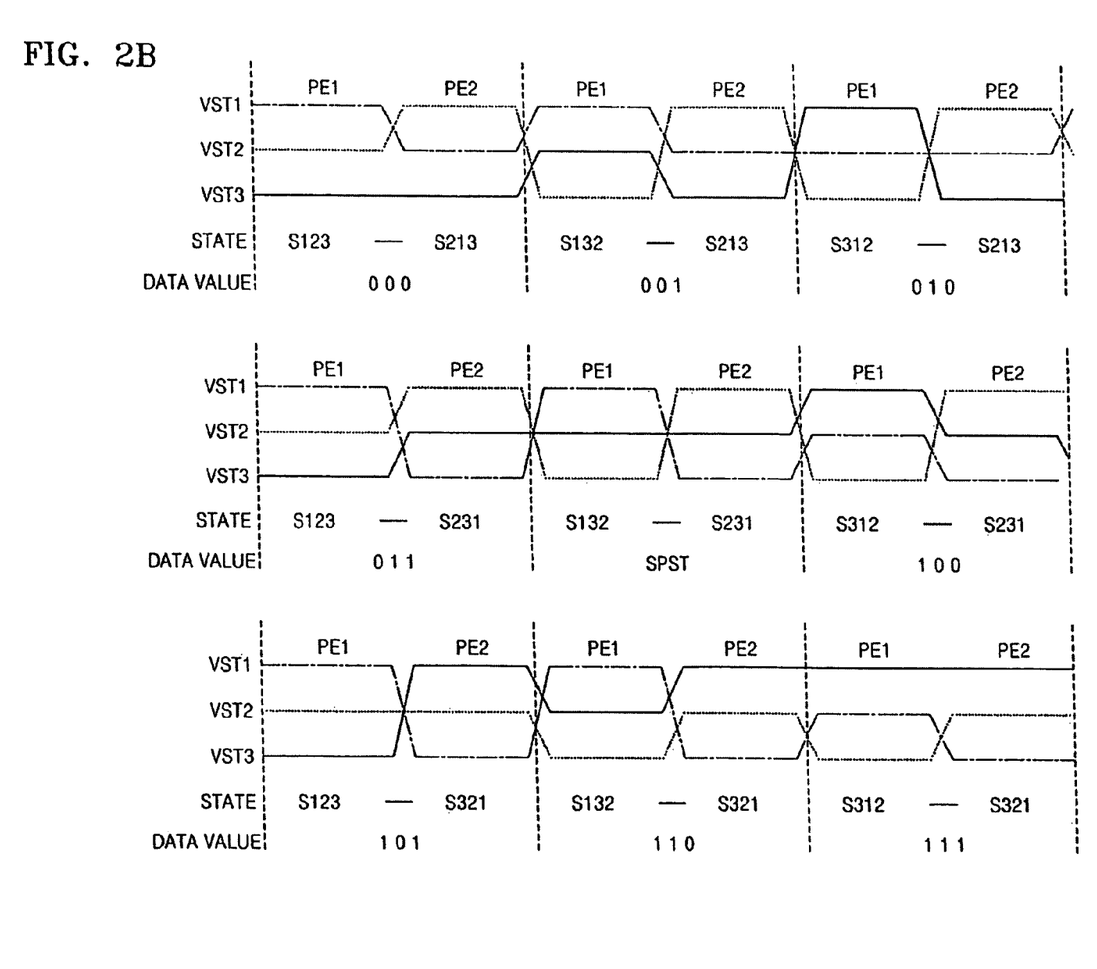

FIGS. 2A and 2B are diagrams of an exemplary embodiment for explaining a clock embedded differential data transferred by TDLS, according to the present invention. Referring to FIGS. 2A and 2B, according to an exemplary embodiment, a relation of the voltage levels in two transfer signals VST1 and VST2 is used for the clock signal VCLK. Therefore, the relation of the voltage levels in two transfer signals VST1 and VST2 during a first data period PE1 and a second data period PE2 is set.

According to an exemplary embodiment of the present invention, a data period is the unit period in which the relation of the voltage levels in three transfer signals is maintained.

In FIGS. 2A and 2B, according to an exemplary embodiment, during the first data period PE1, the voltage level of the first transfer signal VST1 is higher than that of the second transfer signal VST2. And, during the second data period PE2, the voltage level of the first transfer signal VST1 is lower than that of the second transfer signal VST2.

From FIGS. 2A and 2B, the order of the voltage levels in three transfer signals VST1, VST2 and VST3 is easily understood for corresponding data state. For example, at the data state S123, the voltage level of the first transfer signal VST1 is higher than that of the second transfer signal VST2, and the voltage level of the second transfer signal VST2 is higher than that of the third transfer signal VST3.

Further, according to an exemplary embodiment, at the data state S231, the voltage level of the second transfer signal VST2 is higher than that of the third transfer signal VST3, and the voltage level of the third transfer signal VST3 is higher than that of the first transfer signal VST1.

Further, the values of the first, second and third bit data are easily understood for corresponding data states during the first period PE1 and the second period PE2.

According to an exemplary embodiment, when the data state during the first period PE1 is 'S123' and the data state during the second period PE2 is 'S231', the values of the first, second and third bit data are '011'. Further, when the data state during the first period PE1 is 'S132' and the data state during the second period PE2 is 'S321', the values of the first to third bit data are '110'.

Particularly, according to another exemplary embodiment, a special case SPST is supposed. For the special case SPST, the data state during the first period PE1 is 'S132' and the data state during the second period PE2 is 'S231'. That is, for the special case SPST, the voltage level of the first transfer signal VST1 is between the voltage levels of the second transfer signal VST2 and the third transfer signal VST3 during both of the first period PE1 and the second period PE2.

Consequently, using the relation of the voltage levels in three transfer signals VST1, VST2 and VST3 during the two data periods, three bit data can be transferred with the clock signal. In the current exemplary embodiment, the special state SPST is provided which is used for a special purpose.

Returning to FIG. 1, the clock embedded differential data receiving system of the present invention further includes a monitoring portion 100, a data generating portion 200 and a timing controller 300.

According to an exemplary embodiment, the monitoring portion 100 monitors the voltage levels of the first, second and third transfer signals VST1, VST2 and VST3, and generates the clock signal VCLK, a first pre-data PRDAT1 and a second pre-data PRDAT2.

At this time, the logic state of the clock signal VCLK is determined according to a comparison of the voltage levels between the first transfer signal VST1 and the second transfer signal VST2. The logic state of the first pre-data PRDAT1 is determined according to a comparison of the voltage levels between the second transfer signal VST2 and the third transfer signal. VST3, and the logic state of the second pre-data PRDAT2 is determined according to a comparison of the voltage levels between the third transfer signal VST3 and the first transfer signal VST1.

In the current exemplary embodiment, the monitoring portion 100 includes a first comparator 110, a second comparator 120 and a third comparator 130. The first comparator 110 compares the voltage level of the first transfer signal VST1 with that of the second transfer signal VST2, and generates the clock signal VCLK. When the voltage level of the first transfer signal VST1 is higher than that of the second transfer signal VST2, the clock signal VCLK is "H". In contrast, when the voltage level of the first transfer signal VST1 is lower than that of the second transfer signal VST2, the clock signal is "L".

The second comparator 120 compares the voltage level of the second transfer signal VST2 with that of the third transfer signal VST3, and generates the first pre-data PRDAT1. According to an exemplary embodiment, when the voltage level of the second transfer signal VST2 is higher than that of the third transfer signal VST3, the first pre-data PRDAT1 is "H". In contrast, when the voltage level of the second transfer signal VST2 is lower than that of the third transfer signal VST3, the first pre-data PRDAT1 is "L".

According to an exemplary embodiment, the third comparator 130 compares the voltage level of the third transfer signal VST3 with that of the first transfer signal VST1, and generates the second pre-data PRDAT2. When the voltage level of the third transfer signal VST3 is higher than that of the first transfer signal VST1, the second pre-data PRDAT2 is "H". In contrast, when the voltage level of the third transfer signal VST3 is lower than that of the first transfer signal VST1, the second pre-data PRDAT2 is "L".

The data generating portion 200 detects the first pre-data PRDAT1 and the second pre-data PRDAT2 in response to a sampling control signal VSAM. That is, the data generating portion 200 detects the logic states the first pre-data PRDAT1 and the second pre-data PRDAT2 at the transition of the sampling control signal VSAM. In the current exemplary embodiment, the sampling control signal VSAM provided from the timing controller 300 is generated by delaying the clock signal VCLK with a delay phase Pd.

According to an exemplary embodiment, the delay phase Pd is approximately $\pi/2$. However, in another exemplary embodiment, the delay phase Pd can be approximately $\pi/3$.

The data generating portion 200 generates an output data group GDOUT with decoding the first pre-data PRDAT1 and the second pre-data PRDAT2. In this exemplary embodiment, the output data group GDOUT includes 3 data bits, which are first, second and third output data DATA1, DATA2 and DATA3.

In the current exemplary embodiment, the data generating portion 200 generates a special confirm signal SC with decoding the first pre-data PRDAT1 and the second pre-data PRDAT2.

The special confirm signal SC is activated when the voltage levels of the first, second and third transfer signals VST1, VST2 and VST3 are in a special order. That is, the special confirm signal SC is activated at the special state SPST.

According to an exemplary embodiment, the data generating portion 200 includes a data sampling unit 210 and a decoder 230. The data sampling unit 210 generates a first leading data LEDAT1, a second leading data LEDAT2, a first legging data LGDAT1 and a second legging data LGDAT2. According to the current exemplary embodiment, the value of the first leading data LEDAT1 is determined by the value of the first pre-data PRDAT1 at a leading transition of the sampling control signal VSAM. Further, the value of the second leading data LEDAT2 is determined by the value of the second pre-data PRDAT2 at the leading transition of the sampling control signal VSAM. In addition, the value of the first legging data LGDAT1 is determined by the value of the first pre-data PRDAT1 at the legging transition of the sampling control signal VSAM. Also, the value of the second legging data LGDAT2 is determined by the value of the second pre-data PRDAT2 at the legging transition of the sampling control signal VSAM.

In the current exemplary embodiment, the leading transition of the sampling control signal VSAM means the transition from "L" to "H". Further, the legging transition of the sampling control signal VSAM means the transition from "H" to "L".

According to an exemplary embodiment, the data sampling unit 210 includes a first flip-flop 211, a second flip-flop 212, a third flip-flop 213, a fourth flip-flop 214, a fifth flip-flop 215 and a sixth flip-flop 216.

In the current exemplary embodiment, the first flip-flop 211 generates a first flip output FDAT1. The first flip output FDAT1 depends on the first pre-data PRDAT1 at the leading transition of the sampling control signal VSAM of the first data period PE1.

The second flip-flop 212 generates a second flip output FDAT2. The second flip output FDAT2 depends on the second pre-data PRDAT2 at the leading transition of the sampling control signal VSAM of the first data period PE1.

The third flip-flop 213 generates the first leading data LEDAT1. The first leading data LEDAT1 depends on the first flip output FDAT1 at the legging transition of the sampling control signal VSAM of the second data period PE2.

The fourth flip-flop 214 generates the second leading data LEDAT2. The second leading data LEDAT2 depends on the second flip output FDAT1 at the legging transition of the sampling control signal VSAM of the second data period PE2.

The fifth flip-flop 215 generates the first legging data LGDAT1. The first legging data LGDAT1 depends on the first pre-data PRDAT1 at the legging transition of the sampling control signal VSAM of the second data period PE2.

The sixth flip-flop 216 generates the second legging data LGDAT2. The second legging data LGDAT2 depends on the second pre-data at the legging transition of the sampling control signal VSAM of the second data period PE2.

Therefore, all of the first leading data LEDAT1, the second leading data LEDAT2, the first legging data LGDAT1 and the second legging data LGDAT2 are generated in response to the legging transition of the sampling control signal VSAM of the second data period PE2.

Meanwhile, the decoder 230 decodes the first leading data LEDAT1, the second leading data LEDAT2, the first legging data LGDAT1 and the second legging data LGDAT2 in order to generate the output data group GDOUT, which includes the first, second and third output data DATA1, DATA2 and DATA3. The values of the first, second and third output data DATA1, DATA2 and DATA3 can be easily understood from FIG. 2A and FIG. 2B.

Further, according to an exemplary embodiment, the decoder 230 generates the special confirm signal SC.

Figure 3:
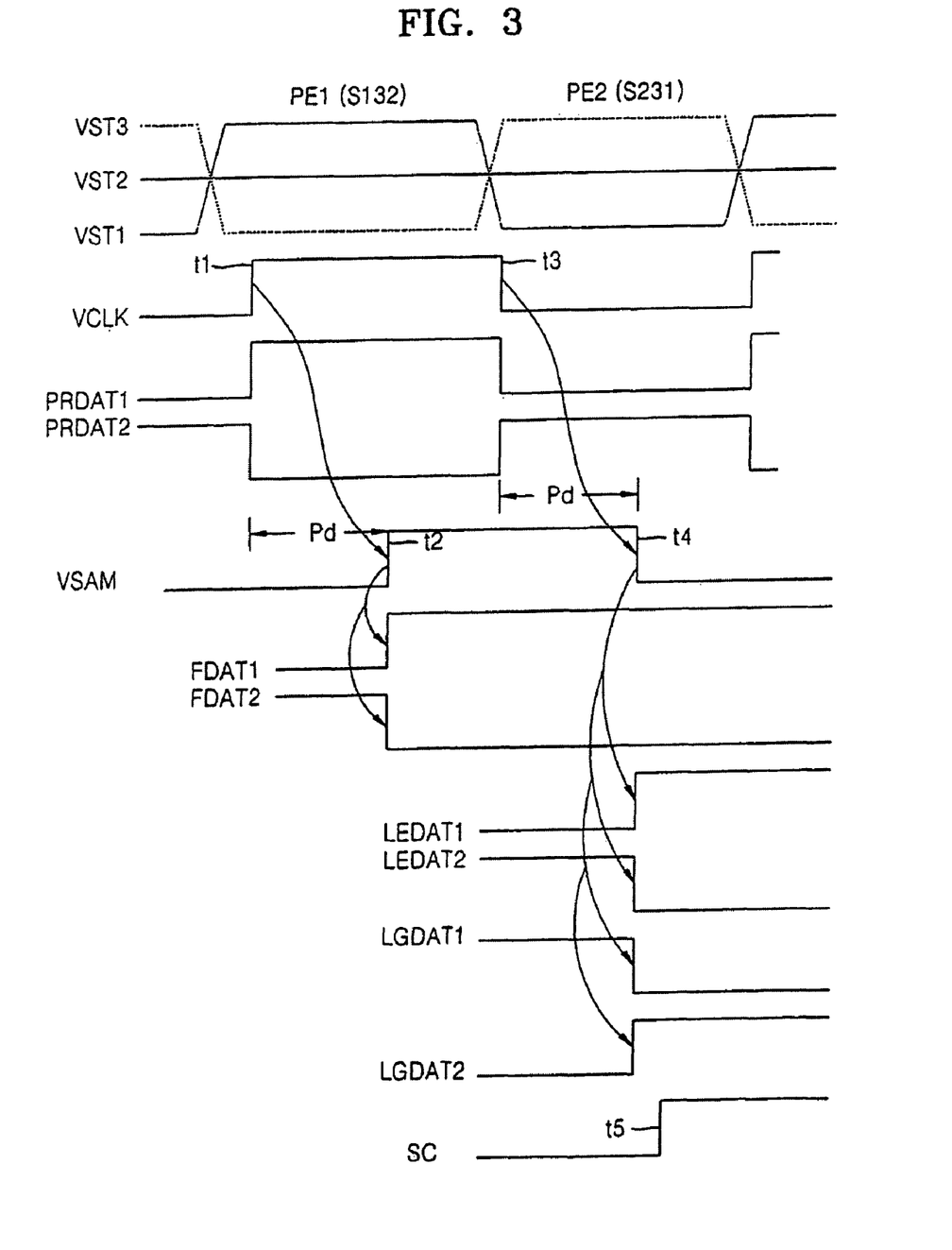
FIG. 3 is a diagram of an exemplary embodiment for explaining the operation of the main signal in FIG. 1 in a special state.

FIG. 3 is a diagram of an exemplary embodiment for explaining the operation of the main signal in FIG. 1, on the condition of the special state, according to the present invention.

Referring to FIG. 3 while referencing FIG. 1, during the first data period PE1, the first, second and third transfer signal VST1, VST2 and VST3 in the state 'S132' are transferred.

Then, the clock signal VCLK and the first pre-data PRDAT1 are "H", and the second pre-data PRDAT2 is "L".

And, the sampling signal VSAM is transited to logic "H" at the time t2. In the current exemplary embodiment, the time t2 is the delayed time with the delay phase Pd from the leading transition time t1 of the clock signal VCLK. At this time, the first flip output FDAT1 and the second flip output FDAT2 are generated. Further, the logic state of the first flip output FDAT1 is same as that of the first pre-data PRDAT1. The logic state of the second flip output FDAT2 is same as that of the second pre-data PRDAT2.

That is, the clock signal VCLK is simultaneously transited with the first flip output FDAT1 and the second pre-data PRDAT2. Meanwhile, the transition time of the sampling signal VSAM is delayed from the transition time of the first flip output FDAT1 and the second pre-data PRDAT2.

In the current exemplary embodiment, a first flip-flop 211 in the data generation portion 200 generates the first flip output FDAT1 in response to the sampling signal VSAM, not to the clock signal VCLK. Also, a second flip-flop 212 in the data generation portion 200 generates the second flip output FDAT2 with responding to the sampling signal VSAM, not to the clock signal VCLK.

Therefore, the sampling margin is increased for sampling the first pre-data PRDAT1 and the second pre-data PRDAT2 by the first flip-flop 211 and the second flip-flop 212.

Continuously referring to FIG. 3 while referencing FIG. 1, during the second data period PE2, the first, second and third transfer signal VST1, VST2 and VST3 in the state 'S231' are transferred. Then, the clock signal VCLK and the first pre-data PRDAT1 are "L", and the second pre-data PRDAT2 is Further, the sampling signal VSAM is transited to logic "L" at the time t4. In the current exemplary embodiment, the time t4 is the delayed time with the delay phase Pd from the legging transition time t3 of the clock signal VCLK. At this time, the first leading data LEDAT1 and the second leading data LEDAT2 are generated. And, the logic state of the first leading data LEDAT1 is same as that of the first flip output FDAT1. The logic state of the leading data LEDAT2 is same as that of the second flip output FDAT2.

Also, the first legging data LGDAT1 and the second legging data LGDAT2 are generated in response to the transition to "L" of the sampling signal VSAM. And, the logic state of the first legging data LGDAT1 is same as that of the first pre-data PRDA1. The logic state of the legging data LGDAT2 is same as that of the second pre-data PRDAT2.

In the current exemplary embodiment, a fifth flip-flop 215 in the data generation portion 200 generates the first legging data LGDAT1 in response to the sampling signal VSAM, not to the clock signal VCLK. Also, a sixth flip-flop 216 in the data generation portion 200 generates the second legging data LGDAT2 in response to the sampling signal VSAM, not to the clock signal VCLK.

Therefore, the sampling margin is increased for sampling the first pre-data PRDAT1 and the second pre-data PRDAT2 by the fifth flip-flop 215 and the sixth flip-flop 216.

Then, according to an exemplary embodiment, the special confirm signal SC is generated with decoding the first leading data LEDAT1, the second leading data LEDAT2, the first legging data LGDAT1 and the second legging data LGDAT2. In case of FIG. 3, the special confirm signal SC activated to "H".

Thus, in the clock embedded differential data receiving system according to an exemplary embodiment of the present invention, 3-bits data can be received with the clock signal VCLK. That is, the clock embedded differential data receiving system of the present invention receives 3-bits data with the clock signal VCLK using the voltage levels of the first, second and third transfer signal VST1, VST2 and VST3 during the successive two data period.

Referring back to FIG. 1, the timing controller 300 delays the transition time point of the clock signal VCLK with a delay phase Pd to generate the sampling control signal VSAM.

In the current exemplary embodiment, the timing controller 300 is enabled with responding to the activation of the special confirm signal SC. When the special confirm signal SC is activated, that is, when the first, second and third transfer signals VST1, VST2 and VST3 are in the special state SPST, the duty of the clock signal VCLK is most stable. Therefore, in the current exemplary embodiment, when the timing controller 300 is enabled in response to the activation of the special confirm signal SC, the sampling margin is improved.

Figure 4:
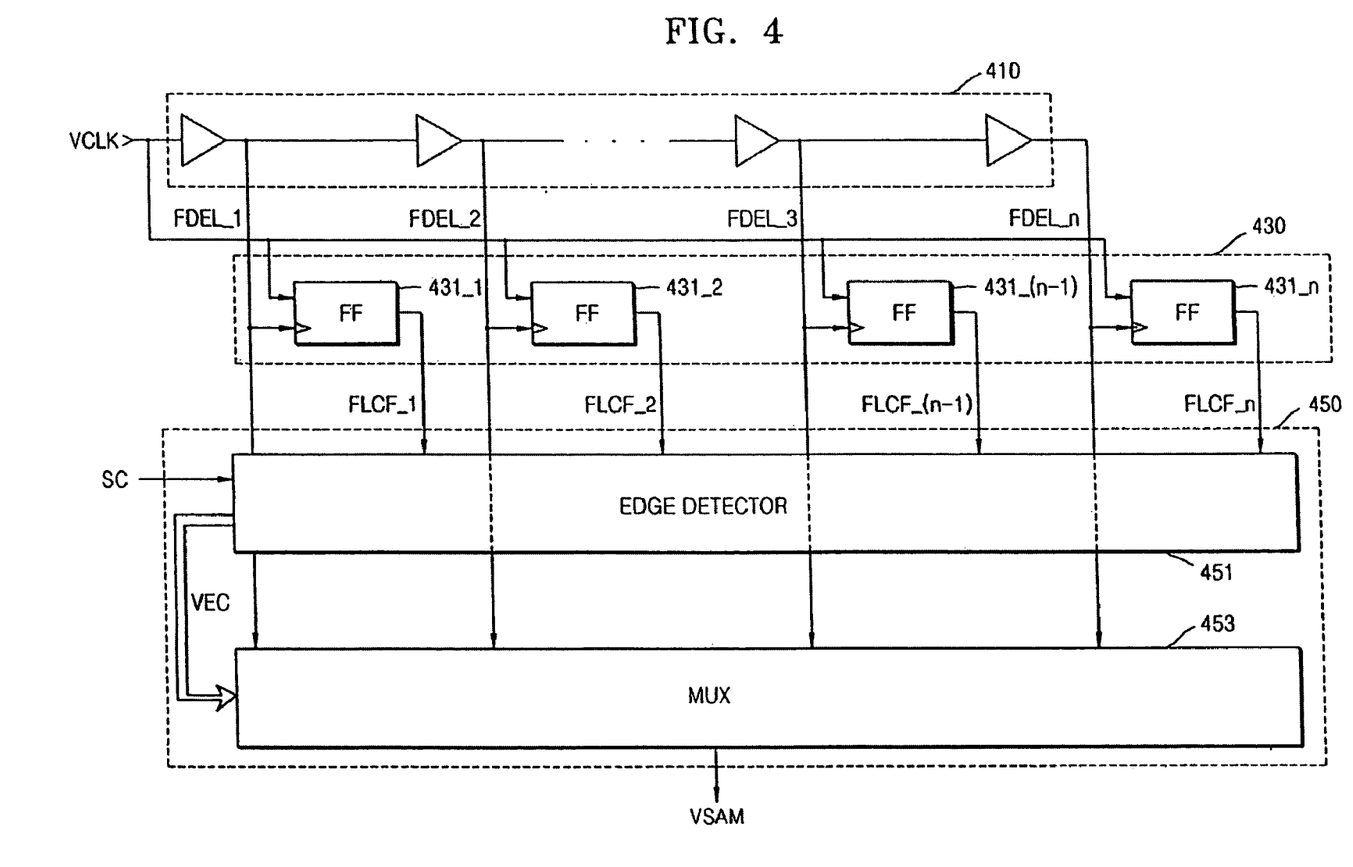
FIG. 4 is a diagram of an exemplary embodiment of the timing controller of FIG. 1, according to the present invention.

FIG. 4 is a diagram of an exemplary embodiment of the timing controller of FIG. 1. The timing controller of FIG. 4 includes a delay unit 410, a logic confirming unit 430 and a sampling signal generating unit 450. The delay unit 410 delays the clock signal VCLK to generate a plurality of delay signals FDEL_1 through FDEL_n. In the current exemplary embodiment, the delay signals FDEL_1 through FDEL_n are sequentially delayed for the clock signal VCLK. According to the present invention, the number of delay signals is not limited to a particular number, and may vary as necessary.

The logic confirming unit 430 includes a plurality of flip-flops 431_1~431_n. In the current exemplary embodiment, the construction of each of the flip-flops 431_1~431_n is same as that of the flip-flop 211-216 of the data sampling unit 210.

Each of the flip-flops 431_1~431_n receives the clock signal VCLK as a clock input node, and receives the corresponding delay signal FDEL_1 through FDEL_n as an input node. And, each of the flip-flops 431_1~431_n generates the corresponding logic confirming signal FLCF_1 to FLCF_n.

Therefore, according to an exemplary embodiment, the logic states of the logic confirming signals FLCF_1 through FLCF_n depend on the corresponding delay signal FDEL_1 through FDEL_n, which is received as the input node of the corresponding flip-flop 431_1~431_n. That is, the logic states of the logic confirming signals FLCF_1 through FLCF_n depend on the delayed amount of the corresponding delay signal FDEL_1 through FDEL_n for the clock signal VCLK.

According to an exemplary embodiment, when the delayed amount of the corresponding delay signal FDEL_1 through FDEL_n for the clock signal VCLK is less than a critical amount, then, the logic state of the corresponding logic confirming signal FLCF_1 through FLCF_n is same as that of the clock signal VCLK before transitioning. The delayed amount of the corresponding delay signal FDEL_1 through FDEL_n for the clock signal VCLK is more than the critical amount, the logic state of the corresponding logic confirming signal FLCF_1 through FLCF_n is same as that of the clock signal VCLK after transitioning.

The sampling signal generating unit 450 detects the logic states of the logic confirming signals FLCF_1 through FLCF_n to generate the sampling signal VSAM. Concretely, the sampling signal generating unit 450 selects one of the delay signals FDEL_1 through FDEL_n according to an edge confirming signal VEC, and the selected delay signal FDEL_1 through FDEL_n is generated as the sampling signal VSAM. At this time, the edge confirming signal VEC is the selected one of the logic confirming signals FLCF_1 through FLCF_n. Further, the logic state of the logic confirming signal FLCF_1 through FLCF_n which is selected as the edge confirming signal VEC is different from that of adjacent logic confirming signal FLCF_1 through FLCF_n.

And, the sampling signal generating unit 450 generates the sampling signal VSAM with selecting one of the delay signals FDEL_1 through FDEL_n according to the edge confirming signal VEC.

In the current exemplary embodiment, the sampling signal generating unit 450 is enabled in response to the special confirm signal SC.

The sampling signal generating unit 450 includes an edge detector 451 and a mux 453. The edge detector 451 detects the logic states of the logic confirming signals FLCF_1 through FLCF_n to generate the edge confirming signal VEC. In the current exemplary embodiment, the edge detector 451 is enabled in response to the special confirm signal SC.

The mux 453 selects one of the delay signals FDEL_1 through FDEL_n using the edge confirm signal VEC. And, the selected delay signals FDEL_1 through FDEL_n is generated as the sampling signal VSAM.

According to an exemplary embodiment, the phase difference between the selected delay signals FDEL_1 through FDEL_n and the edge confirm signal VEC is approximately $\pi/2$. However, in another exemplary embodiment, the phase difference between the selected delay signals FDEL_1 through FDEL_n and the edge confirm signal VEC can be approximately $\pi/3$.

Figure 5:
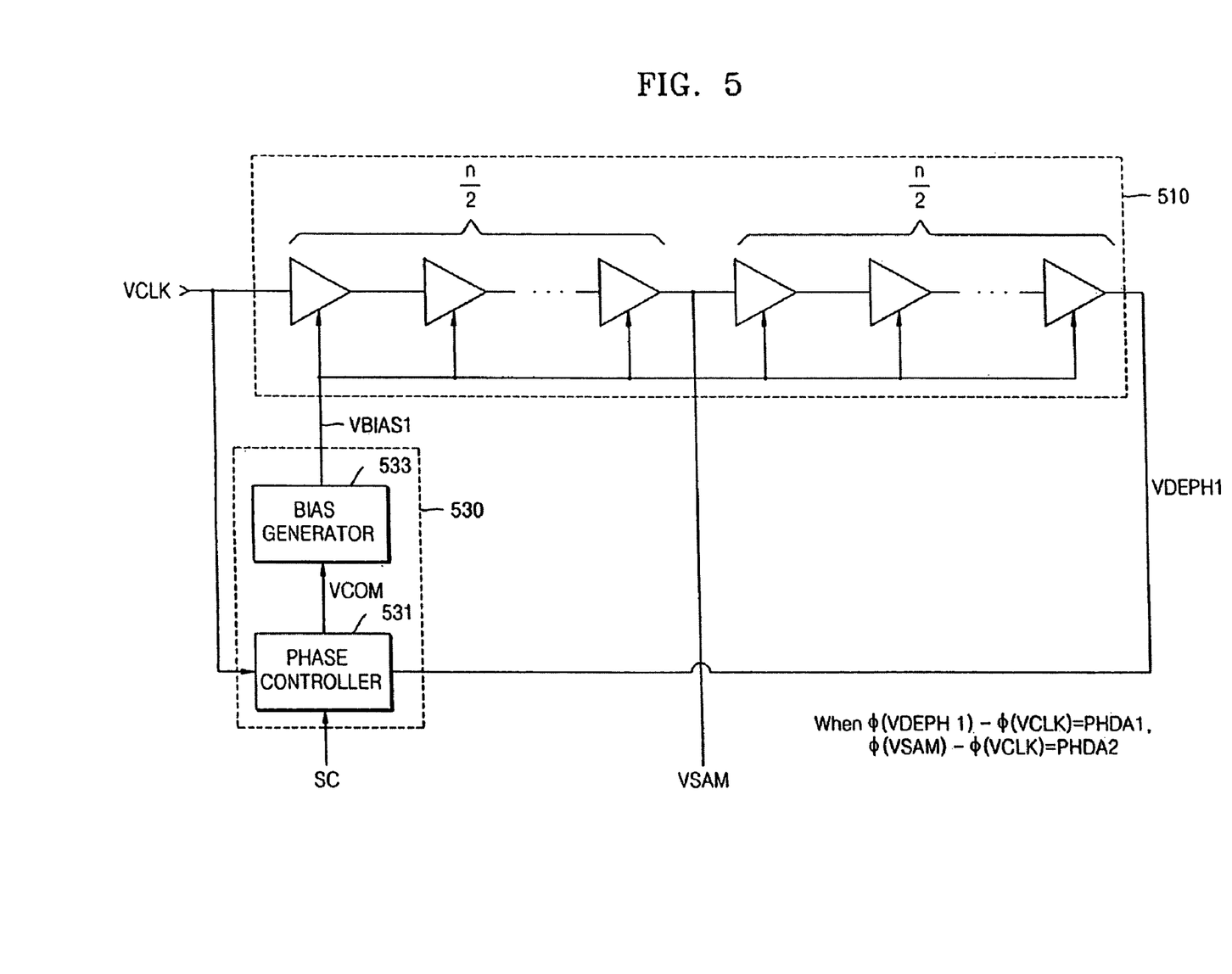
FIG. 5 is a diagram of another exemplary embodiment of the timing controller of FIG. 1, according to the present invention.

FIG. 5 is another exemplary embodiment of the timing controller of FIG. 1 according to the present invention. The timing controller of FIG. 5 includes a delay unit 510 and a bias signal generating unit 530.

The delay unit 510 delays the clock signal VCLK, and thereby generates a phase detect signal VDEPH1 and the sampling signal VSAM. At this time, the phase difference between the phase detect signal VDEPH1 and the clock signal VCLK is controlled by the voltage level of a bias signal VBIAS1. According to an exemplary embodiment, the bias signal VBIAS1 is provided from the bias signal generating unit 530.

Referring to FIG. 5, when the phase detect signal VDEPH1 includes a first phase difference PHDA1 for the clock signal, the sampling signal VSAM includes a second phase difference PHDA2 for the clock signal VCLK. In the current exemplary embodiment, the first phase difference PHDA1 is approximately $\pi$, and the second phase difference PHDA2 is approximately ½ of the first phase difference PHDA1.

According to an exemplary embodiment, the bias signal generating unit 530 compares the phase of the phase detect signal VDEPH1 with that of the clock signal VCLK, and generates the bias signal VBIAS1. The voltage level of the bias signal VBIAS1 depends on the phase difference between the phase detect signal VDEPH1 and the clock signal VCLK. The bias signal VBIAS1 is controlled, so that the phase detect signal VDEPH1 includes the first phase difference PHDA1 for the clock signal VCLK.

In the current exemplary embodiment, the phase difference between the delay signals FDEL_1 through FDEL_n selected as the sampling signal VSAM and the edge confirm signal VEC is approximately $\pi/2$ or $\pi/3$.

In the current exemplary embodiment, the bias signal generating unit 530 is enabled responding to the special confirm signal SC.

As shown in FIG. 5, the bias signal generating unit 530 includes a bias generator 531 and a phase controller 533. The bias generator 531 generates the bias signal VBIAS1. And, the voltage of the bias signal VBIAS1 is controlled in response to a detection control signal VCOM.

The phase controller 533 generates the detection control signal VCOM when detecting the phase difference between the phase detect signal VDEPH1 and the clock signal VCLK. And, the detection control signal VCOM includes information for whether the phase difference of the phase detect signal VDEPH1 to the clock signal VCLK is larger that the first phase difference PHDA1.

In the current exemplary embodiment, the phase controller 533 is enabled in response to the special confirm signal SC.

Figure 6:
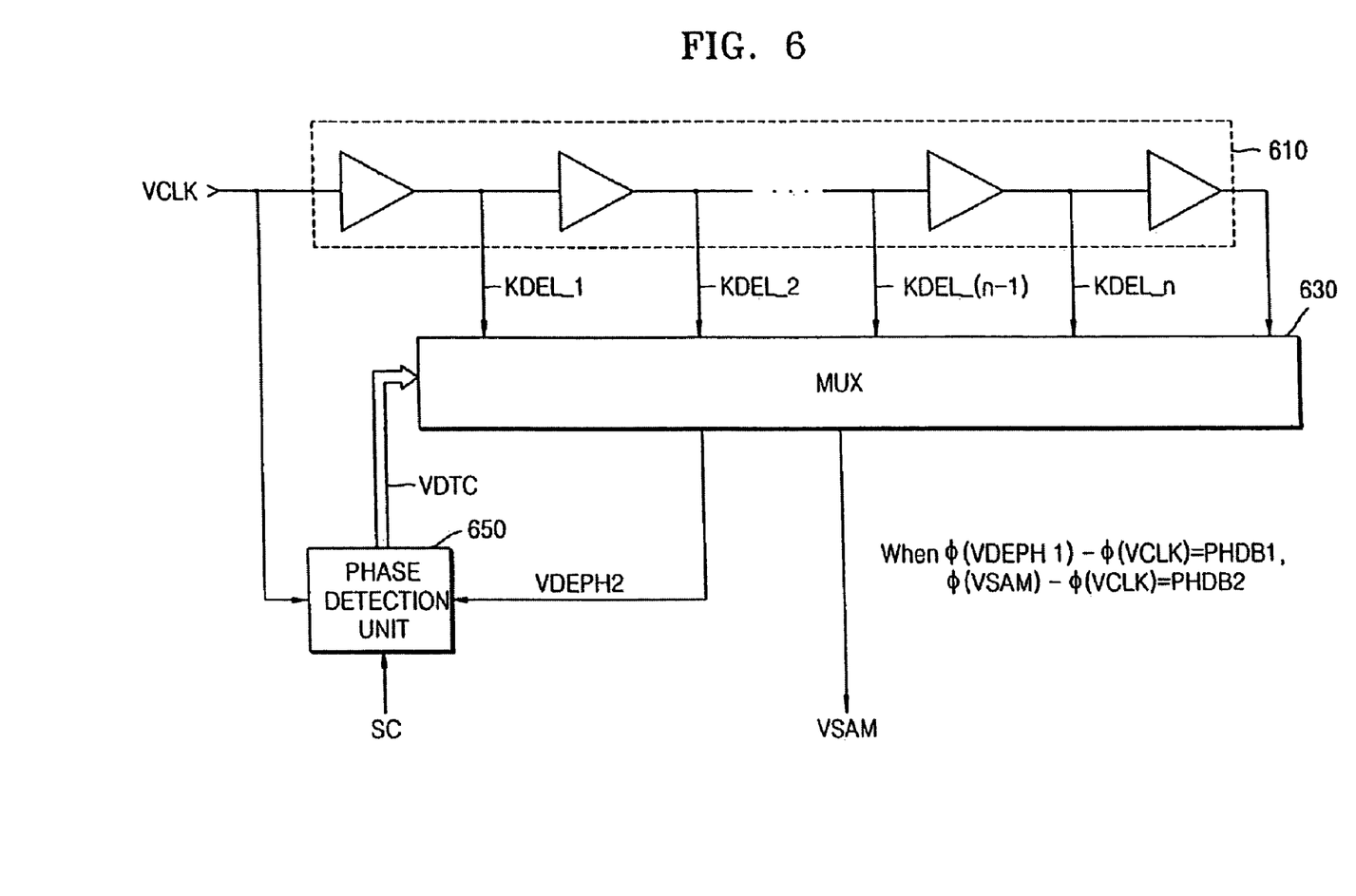
FIG. 6 is a diagram of another exemplary embodiment of the timing controller of FIG. 1, according to the present invention.

FIG. 6 is a diagram of another exemplary embodiment of the timing controller of FIG. 1, according to the present invention. The timing controller of FIG. 6 includes a delay unit 610, a mux 630 and a phase detection unit 650.

The delay unit 610 delays the clock signal VCLK to generate a plurality of delay signals KDEL_1~KDEL_n. And, each of the delay signals KDEL_1~KDEL_n is sequentially delayed for the clock signal VCLK.

The mux 630 selects one of the delay signals KDEL_1 through KDEL_n as the sampling signal VSAM according to a detection control signal VDTC. The mux 630 selects another one of the delay signals. KDEL_1 through KDEL_n as a phase detect signal VDEPH2. When the phase detect signal VDEPH2 includes a first phase difference PHDB1 for the clock signal VCLK, the sampling signal VSAM includes a second phase difference PHDB2 for the clock signal VCLK. According to an exemplary embodiment, the first phase difference PHDB1 is approximately $\pi$, and the second phase difference PHDB2 is approximately ½ of the first phase difference PHDB1.

The phase detection unit 650 compares the phase of the phase detect signal VDEPH2 with that of the clock signal VCLK, and generates the detection control signal VDTC. That is, according to the detection control signal VDTC, the mux 630 controlled to select the delay signal, which has the first phase difference PHDB1 for the clock signal VCLK, as the phase detect signal VDEPH2.

In the current exemplary embodiment, the phase detection unit 650 is enabled in response to the special confirm signal SC.

Figure 7:
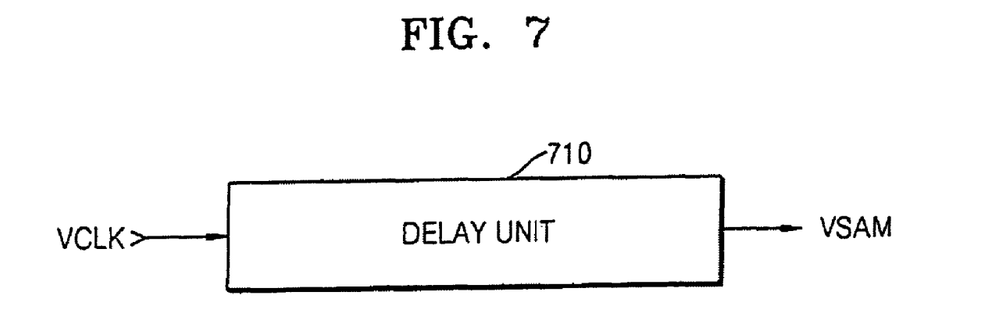
FIG. 7 is a diagram of another exemplary embodiment of the timing controller of FIG. 1, according to the present invention.

FIG. 7 is a diagram of another exemplary embodiment of the timing controller of FIG. 1, according to the present invention. The timing controller of FIG. 7 includes a delay unit 710.

The delay unit 710 delays the clock signal VCLK in order to generate the sampling signal VSAM.

According to the clock embedded differential data receiving system of the present invention, three bit data can be transferred with the clock signal by ternary lines differential signaling. That is, using the relation of the voltage levels in three transfer signals VST1, VST2 and VST3 during the two data periods, three bit data can be transferred with the clock signal by ternary lines differential signaling.

Also, the data generating portion 200 is controlled to sample the first pre-data PRDAT1 and the second pre-data PRDAT2 in response to the leading and legging transition of the sampling control signal VSAM.

Therefore, according to an exemplary embodiment, in the clock embedded differential data receiving system of the present invention, the sampling margin is increased for sampling the first pre-data PRDAT1 and the second pre-data PRDAT2.

The exemplary embodiments above are described such that the timing controller, the edge detector, the phase controller and the phase detection unit are enabled in response to the special confirm signal.

Otherwise, it is available for the present invention to be embodied in the feature that the timing controller, the edge detector, the phase controller and the phase detection unit are enabled at every data period without responding to the special confirm signal.

While the present invention has been shown and described with reference to some exemplary embodiments thereof, it should be understood by those of ordinary skill in the art that various changes in form and details may be made therein without departing from the spirit and scope of the present invention as defined by the appending claims.

What is claimed is:

1. A clock embedded differential data receiving system for receiving first, second and third transfer signals transferred via ternary lines, the clock embedded differential data receiving system, comprising:
    a monitoring portion which monitors voltage levels of the first, second and third transfer signals, and generates a clock signal, a first pre-data and a second pre-data, wherein the clock signal comprises a logic state according a comparison of the voltage levels between the first transfer signal and the second transfer signal, and wherein the first pre-data comprises a logic state according to a comparison of the voltage levels between the second transfer signal and the third transfer signal, and wherein the second pre-data comprises a logic state a comparison of the voltage levels between the third transfer signal and the first transfer signal;
    a data generating portion which detects the first pre-data and the second pre-data in response to a sampling control signal, and generates an output data group with decoding the first pre-data and the second pre-data; and
    a timing controller which delays a transition time point of the clock signal with a delay phase and generates the sampling control signal,
    wherein the data generating portion comprises:
        a data sampling unit which generate a first leading data, a second leading data, a first legging data and a second legging data, wherein a value of the first leading data is determined by a value of the first pre-data at the leading transition of the sampling control signal, a value of the second leading data is determined by a value of the second pre-data at the leading transition of the sampling control signal, a value of the first legging data is determined by a value of the first pre-data at the legging transition of the sampling control signal, and a value of the second legging data is determined by a value of the second pre-data at the legging transition of the sampling control signal; and
        a decoder which decodes the first leading data, the second leading data, the first legging data and the second legging data to generate the output data group.

2. The system claim 1, wherein the data sampling unit comprises:
    a first flip-flop which generates a first flip output according to the first pre-data at the leading transition of the sampling control signal;
    a second flip-flop which generates a second flip output according to the second pre-data at the leading transition of the sampling control signal;
    a third flip-flop which generates the first leading data according to a first flip output at the legging transition of the sampling control signal;
    a fourth flip-flop which generates the second leading data according to a second flip output at the legging transition of the sampling control signal;
    a fifth flip-flop which generates the first legging data according to the first pre-data at the legging transition of the sampling control signal; and
    a sixth flip-flop which generates the second legging data according to the second pre-data at the legging transition of the sampling control signal.

3. The system of claim 1, wherein the timing controller comprises:
    a delay unit which delays the clock signal and generates a plurality of delay signals, wherein each of the delay signals is delayed in sequence;
    a logic confirming unit which confirms the logic states of a plurality of logic confirming signals, wherein each of the logic confirming signals comprises a logic state according to a corresponding delay signal at the transition of the clock signal; and
    a sampling signal generating unit which generates the sampling signal by selecting one of the delay signals according to an edge confirming signal, wherein the edge confirming signal is a selected one of the logic confirming signals, wherein a logic state of the logic confirming signal selected as the edge confirming signal is different from that of adjacent logic confirming signal.

4. The system of claim 3, wherein the sampling signal generating unit comprises:
    an edge detector which detects the logic states of logic confirming signal to generate the edge confirming signal; and
    a mux which generates a sampling signal using the edge confirm signal.

5. The system of claim 3, wherein the logic confirming unit comprises:
    a plurality of flip-flops which receive a corresponding delay signal and the clock signal as input and clock input, respectively, and output a corresponding logic confirming signal.

6. A clock embedded differential data receiving system for receiving first, second and third transfer signals transferred via ternary lines, the clock embedded differential data receiving system, comprising:
    a monitoring portion which monitors voltage levels of the first, second and third transfer signals, and generates a clock signal, a first pre-data and a second pre-data, wherein the clock signal comprises a logic state according a comparison of the voltage levels between the first transfer signal and the second transfer signal, and wherein the first pre-data comprises a logic state according to a comparison of the voltage levels between the second transfer signal and the third transfer signal, and wherein the second pre-data comprises a logic state a comparison of the voltage levels between the third transfer signal and the first transfer signal;
    a data generating portion which detects the first pre-data and the second pre-data in response to a sampling control signal, and generates an output data group with decoding the first pre-data and the second pre-data; and
    a timing controller which delays a transition time point of the clock signal with a delay phase and generates the sampling control signal,
    wherein the timing controller comprises:
        a delay unit which delays the clock signal to generate a phase detect signal and the sampling signal, wherein the sampling signal comprises a second phase difference for the clock signal when the phase detect signal comprises a first phase difference for the clock signal, wherein the first phase difference is controlled by a bias signal; and
        a bias signal generating unit which generates the bias signal by comparing the phase of the phase detect signal with that of the clock signal.

7. The system of claim 6, wherein the bias signal generating unit comprises:
- a phase controller which generates a detection control signal when detecting a phase difference between the phase detect signal and the clock signal; and
- a bias generator which generates the bias signal, wherein the voltage of the bias signal is controlled with responding to the detection control signal.

8. The system of claim 7, wherein the second phase difference is half of the first phase difference.

9. The system of claim 1, wherein the timing controller comprises:
- a delay unit which delays the clock signal to generate a plurality of delay signals, wherein each of the delay signals is delayed in sequence;
- a mux which selects one of the delay signals as the sampling signal according to a detection control signal, and selects another one of the delay signals as a phase detect signal, wherein the sampling signal comprises a second phase difference for the clock signal when the phase detect signal comprises a first phase difference for the clock signal; and
- a phase detection unit which generates the detection control signal by comparing the phase of the phase detect signal with that of the clock signal.

10. The system of claim 9, wherein the second phase difference is half of the first phase difference.

11. The system of claim 1, wherein the timing controller comprises:
- a delay unit which delays the clock signal to generate the sampling signal.

12. A clock embedded differential data receiving system for receiving first, second and third transfer signals transferred via ternary lines, the clock embedded differential data receiving system, comprising:
- a monitoring portion which monitors voltage levels of the first, second and third transfer signals, and generates a clock signal, a first pre-data and a second pre-data, wherein the clock signal comprises a logic state according to a comparison of the voltage levels between the first transfer signal and the second transfer signal, the first pre-data comprises a logic state according to a comparison of the voltage levels between the second transfer signal and the third transfer signal, and the second pre-data comprises a logic state according to a comparison of the voltage levels between the third transfer signal and the first transfer signal;
- a data generating portion which detects the first pre-data and the second pre-data in response to a sampling control signal, and generates an output data group and a special confirm signal with decoding the first pre-data and the second pre-data, wherein the special confirm signal is activated when the voltage levels of the first, second and third transfer signals are in a special order; and
- a timing controller which delays a transition time point of the clock signal with a delay phase, and generates the sampling control signal.

13. The system of claim 12, wherein the timing controller comprises:
- a delay unit which delays the clock signal to generate a plurality of delay signals, wherein each of the delay signals is delayed in sequence;
- a logic confirming unit which confirms the logic states of a plurality of logic confirming signals, wherein each of the logic confirming signals comprises a logic state according to a corresponding delay signal at the transition of the clock signal; and
- a sampling signal generating unit which generates the sampling signal with selecting one of the delay signals according to an edge confirming signal, the sampling signal generating unit being enabled in response to the special confirm signal, wherein the edge confirming signal is the selected one of the logic confirming signals, and the logic state of the logic confirming signal selected as the edge confirming signal is different from that of adjacent logic confirming signal.

14. The system of claim 13, wherein the sampling signal generating unit comprises:
- an edge detector which detects the logic states of logic confirming signal and generates the edge confirming signal, the edge detector being enabled in response to the special confirm signal; and
- a mux which generates the sampling signal using the edge confirm signal.

15. The system of claim 12, wherein the timing controller comprises:
- a delay unit which delays the clock signal to generate a phase detect signal and the sampling signal, wherein the sampling signal comprises a second phase difference for the clock signal when the phase detect signal comprises a first phase difference for the clock signal, wherein the first phase difference is controlled by a bias signal, and
- a bias signal generating unit which generates the bias signal by comparing the phase of the phase detect signal with that of the clock signal, the bias signal generating unit being enabled in response to the special confirm signal.

16. The system of claim 15, wherein the bias signal generating unit comprises:
- a phase controller which generates a detection control signal with detecting of a phase difference between the phase detect signal and the clock signal, the phase controller being enabled in response to the special confirm signal; and
- a bias generator which generates the bias signal, wherein the voltage of the bias signal is controlled in response to the detection control signal.

17. The system of claim 12, wherein the timing controller comprises:
- a delay unit which delays the clock signal and generates a plurality of delay signals, wherein each of the delay signals is delayed in sequence;
- a mux which selects one of the delay signals as the sampling signal according to a detection control signal, and select another one of the delay signals as a phase detect signal, wherein the sampling signal comprises a second phase difference for the clock signal when the phase detect signal comprises a first phase difference for the clock signal; and
- a phase detection unit which generates the detection control signal by comparing a phase of the phase detect signal with that of the clock signal, the phase detection unit being enabled in response to the special confirm signal.

* * * * *